United States Patent
Trimboli et al.

(10) Patent No.: US 9,840,275 B2
(45) Date of Patent: Dec. 12, 2017

(54) METHOD AND SYSTEM FOR DETECTING STEERING WHEEL CONTACT

(71) Applicant: FORD GLOBAL TECHNOLOGIES, LLC, Dearborn, MI (US)

(72) Inventors: Sergio Trimboli, Cologne (DE); Ronny Hause, Cologne (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 14/303,447

(22) Filed: Jun. 12, 2014

(65) Prior Publication Data

US 2014/0371989 A1   Dec. 18, 2014

(30) Foreign Application Priority Data

Jun. 13, 2013  (DE) .................. 10 2013 211 052

(51) Int. Cl.
*B62D 6/10* (2006.01)
*B60W 40/09* (2012.01)

(52) U.S. Cl.
CPC ............ *B62D 6/10* (2013.01); *B60W 40/09* (2013.01)

(58) Field of Classification Search
CPC ........ B62D 6/10; B62D 15/00; B62D 15/025; B62D 6/00; B60W 40/09
USPC ..................................... 701/41, 44
See application file for complete search history.

(56) References Cited

U.S. PATENT DOCUMENTS

| | | | | |
|---|---|---|---|---|
| 2001/0041957 A1* | 11/2001 | McCann | ............. | B62D 5/0463 701/41 |
| 2010/0228417 A1* | 9/2010 | Lee | ........................ | B60W 50/16 701/23 |
| 2014/0180544 A1* | 6/2014 | Itamoto | .................. | B62D 5/049 701/41 |
| 2016/0001811 A1* | 1/2016 | Endo | .................... | B62D 5/0466 701/41 |

FOREIGN PATENT DOCUMENTS

| | | |
|---|---|---|
| CN | 101823487 A | 9/2010 |
| DE | 10 2007 039 332 A1 | 2/2008 |
| DE | 10 2008 042 277 B4 | 4/2011 |
| DE | 10 2011 106 900 A1 | 1/2013 |

OTHER PUBLICATIONS

Examination Report issued in corresponding German Patent Application No. 10 2013 211 052.9., filed Jun. 13, 2013, Google translation.
Chinese Notification of First Office Action for related Application No. CN201410259644.2, dated Jun. 28, 2017.

* cited by examiner

*Primary Examiner* — Nga X Nguyen
(74) *Attorney, Agent, or Firm* — Jones Robb, PLLC; Raymond L. Coppiellie

(57) ABSTRACT

In accordance with various exemplary embodiments, the present disclosure describes methods and systems for detecting steering wheel contact by a user. A test signal may be transmitted to a power assisted steering system of a vehicle, where the test signal may apply torque to the steering wheel of the vehicle. A torque sensor may then receive measurements signals indicative of steering wheel torque. The torque indicated by the measurement signals may be compared to an expected torque. Based on the comparison, it may be determined whether the user is in contact with the steering wheel.

17 Claims, 3 Drawing Sheets

METHOD AND SYSTEM FOR DETECTING STEERING WHEEL CONTACT

CROSS REFERENCE TO RELATED APPLICATIONS

This application claims priority to German Application No. 102013211052.9, filed on Jun. 13, 2013, the entire content of which is incorporated by reference herein.

TECHNICAL FIELD

The present disclosure relates generally to a method and apparatus for detecting steering wheel contact by a user and to a vehicle for carrying out the method of the disclosure.

INTRODUCTION

In modern vehicles it can be beneficial to detect whether the driver has his hands on the steering wheel (e.g., to detect whether the driver is ready to carry out a steering action). In addition to safety aspects, steering assistants may include an active correction possibility for the driver to be used in certain circumstances. For example, a provision may be made for a steering assistance system to be activated when the driver has his hands on the steering wheel.

While dedicated sensors may be used to determine driver contact with the steering wheel, the cost of this approach renders it undesirable. Thus, it may be desirable to using existing vehicle components to monitor whether a driver's hands are on the steering wheel.

SUMMARY

In accordance with various exemplary embodiments, the present disclosure describes methods and systems for detecting steering wheel contact by a user. A test signal may be transmitted to a power assisted steering system of a vehicle, where the test signal may apply torque to the steering wheel of the vehicle. A torque sensor may then receive measurements signals indicative of steering wheel torque. The torque indicated by the measurement signals may be compared to an expected torque. Based on the comparison, it may be determined whether the user is in contact with the steering wheel.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
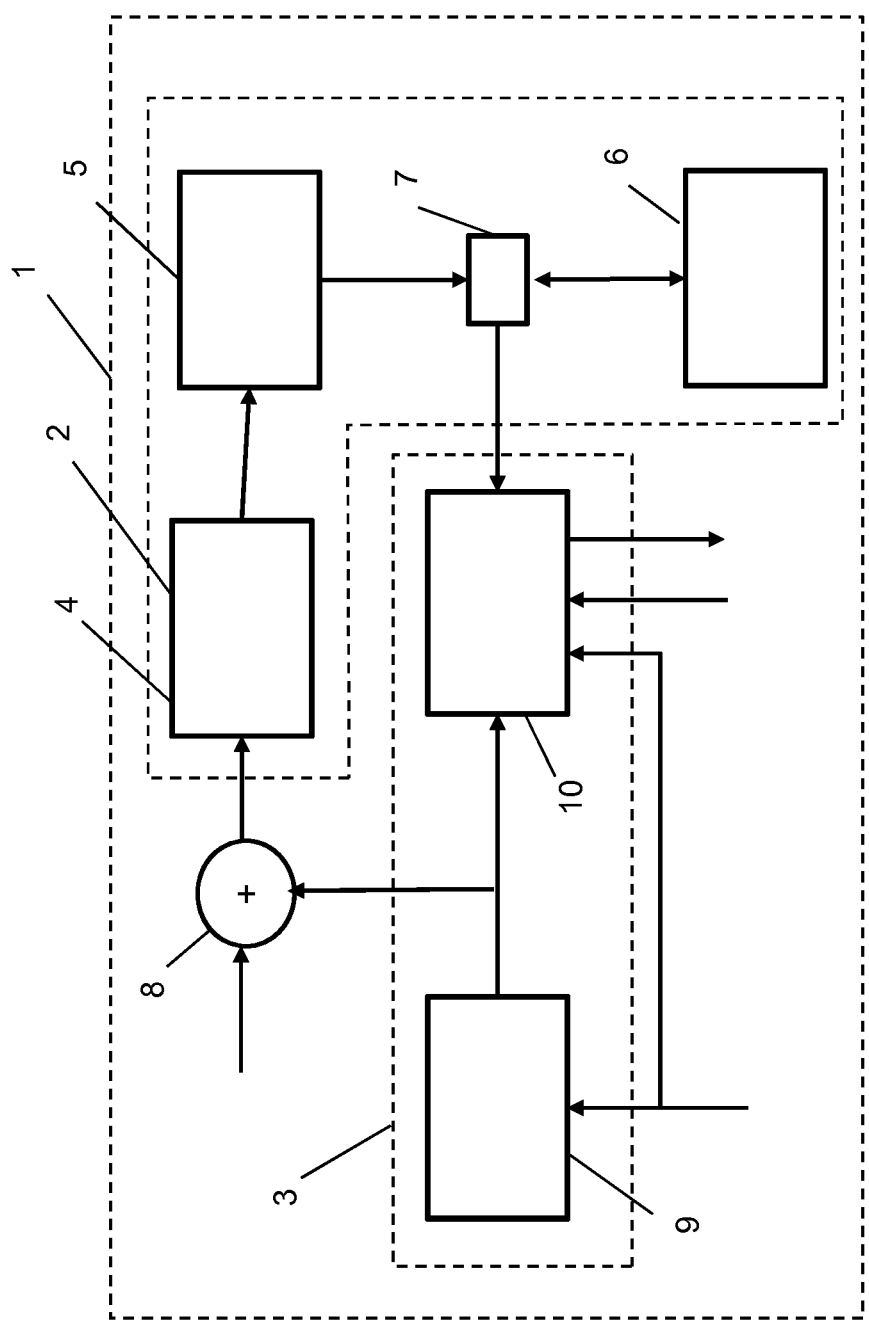
FIG. 1 shows schematic illustration of an apparatus for detecting steering wheel contact by a user in accordance with the present teachings.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a method for detecting steering wheel contact by a user is provided. The method includes generating a tunable signal and generating a torque via the EPAS based on the signal. A torque sensor measures the actual steering column torque, which is representative of a user's response to the torque applied based on the generated signal. Based on a comparison of the measured torque and an expected torque, a control system determines whether the user's hands are on or off the steering wheel of the vehicle.

The disclosure also provides a system for detecting steering wheel contact by a user. In accordance with the present teachings, an exemplary embodiment may include one or more sensors (e.g., a torque sensor) for detecting the steering wheel contact. For example, a sensor for measuring the steering wheel torque may be provided in motor vehicles that includes electric power-assisted steering (EPAS). Accordingly, the method of the disclosure can be implemented with existing sensors in certain embodiments. This reduces opportunities for interference that might occur with the use of dedicated sensors as well as the cost associated with such dedicated sensors.

In accordance with the present teachings, in an exemplary embodiment a manager may be used for detecting the steering wheel contact in order to minimize distortion from brief interfering influences, such as road noise, bumps and pots, road inclination, friction, etc. The manager may be designed to apply a spectral transformation (including deterministic filtering) or a statistical filter method (e.g., Kalman filter) to the measurement variables or may contain a neural network.

In accordance with the present teachings, in an exemplary embodiment, vehicle measurement signals also are supplied to the manager as measurement variables. Such vehicle measurement signals may be, for example, signals from a module like anti-lock braking system, a power steering control system (e.g., PSCM), an inertial measurement unit (e.g., restraint control module RCM), a powertrain control system (e.g., PCM), not excluding a combination of the mentioned modules. The measurement variables may be stored by the manager and, in some instances, may be evaluated by the manager at a later time. Accordingly, use of measurement variables stored over a period of time may be utilized in order to more reliably detect contact of the steering wheel. Thus, the analysis may be real-time, may be made periodically, or may be substantially continuous.

In accordance with the present teachings, in an exemplary embodiment a test signal can be generated. The test signal may be generated by a signal generator and may be, for example, an online tunable signal (e.g., sine sweep). For example, a test signal can trigger movement by a power assisted steering system. The triggering signal may be output, for example, regularly or in such situations in which steering wheel contact (e.g., by the hand of a driver) is prescribed. In an embodiment, the triggering signal may be output when it is not otherwise detected that the driver has his hands on the steering wheel. As an example, during a steering maneuver, it is clear that if no other functions are applying torque via the EPAS, then the driver is intentionally steering the vehicle applying torque via his hands.

In accordance with the present teachings, in an exemplary embodiment, torque may be applied to the power-assisted steering system (e.g., based on the test signal). The torque may have an amplitude which is selected such that a change in a steering wheel angle during application (e.g., driving) remains smaller than a threshold angle. In an embodiment, the test signal may be intended to remain unnoticed by the driver and is not intended to influence the operation of the vehicle. The test signal may comprise a null mean value. In other words, any influence on the operation of the vehicle on account of the test signal may be canceled out by carrying out the method.

In accordance with the present teachings, in an exemplary embodiment the generation of the test signal and the acting on the power-assisted steering system (e.g., applying torque) can be terminated after a predetermined period of time has elapsed. Here, the method may be terminated where steering wheel contact is not reliably detected (e.g., after a period of time).

A second aspect of the disclosure relates to a data storage medium having program code which, when executed by a control unit of a vehicle having a power-assisted steering system, which comprises an electric servomotor, and having a torque sensor for measuring a steering wheel torque, carries out the method according to the disclosure. Another aspect of the disclosure introduces a vehicle having a power-assisted steering system which comprises an electric servomotor, having a torque sensor which measures a steering wheel torque of a steering wheel of the motor vehicle, and having a control unit which carries out the method according to the disclosure.

The disclosure is described in more detail below using a depiction of an exemplary embodiment. FIG. 1 depicts a vehicle that may carry out the method according to an embodiment of the disclosure.

FIG. 1 shows vehicle 1 which can carry out the method in accordance with an embodiment. Vehicle 1 may comprise a power-assisted steering system 2 (e.g., partially illustrated in FIG. 1). The power-assisted steering system 2 comprises an electric servomotor 4 which, controlled by a control signal, may move a steering column 5 or else a toothed rack of a steering transmission in order to assist a steering movement carried out by a driver using steering wheel 6 of vehicle 1. In this example, steering wheel 6 may be coupled, for example via a torsion bar (not illustrated), to steering column 5 on which torque sensor 7 may be arranged. In certain instances, torque sensor 7 may be provided in order to determine the torque exerted on steering wheel 6 by the driver and to track steering column 5 to the driver's steering movement using the torque with the aid of electric servomotor 4. Here, the driver can exert a greater torque on the steering transmission of the steering system with a relatively low torque on the steering wheel.

In accordance with the present teachings, in an exemplary embodiment control unit 3 comprises signal generator 9 and observer-oriented manager 10. The manager may integrate an observer with standard vehicle models and may also select a proper signal to be generated. For example, since the driving scenario is observed via standard vehicle measurements, the manager may choose a signal that will be clearly measurable at the column torque (i.e., a signal that generates torque at the column which is the largest with respect to the current driving scenario but not noticeable by the driver). While the signal is provided as torque to the driver, the manager (e.g., integrated observer) may measure the torque (reaction to the signal). Thus, the measured torque amplitude/frequency can be evaluated in order to determine if the driver is in contact with the steering wheel (e.g., has hands on the steering wheel).

Signal generator 9 and manager 10 may be in the form of software on a microcontroller or some other suitable device or else may be constructed as hardware units. The manager 10 may receive the measurement signal output by torque sensor 7 and, in some instances, may receive measurement and state signals from vehicle 1 (e.g., measurement signals from an anti-lock braking system and/or measurement signals for the vehicle speed, wheel speeds, yaw rate or lateral acceleration), and may simulate (e.g. estimate) the measurement signal from the torque sensor 7. In this example, manager 10 may use a model of the overall system (e.g., vehicle) to predict system response to the abovementioned stimuli (e.g., test signal) received by the manger 10 and may compare it with the actual measured values (e.g., the measurement signal received from torque sensor 7). If the predicted system response differs from the actual system response, the model and its internal variables may be adapted based on the determined difference. Analysis strategies known in the art, such as spectral analysis (including deterministic filtering), a neural network or statistical filtering, can be used for this purpose.

In accordance with the present teachings, in an exemplary embodiment, a generated input signal may comprise sinusoidal wave with frequency F and amplitude A. Given a nominal transfer function between the motor of vehicle 1 and the steering wheel torque sensor, by calculating a phase shift F' and the amplitude gain A' between the input and the output of the system under exam, manager 10 may determine whether the driver is in contact with the steering wheel (e.g., a maximum phase shift threshold is passed, considering a 'nominal' threshold measured when the driver is not in contact with the steering wheel). To compensate for noise in the measurements, a statistical method can be used for the threshold (e.g., a mean over some seconds of the phase shift over the mean threshold to indicate when the driver is in contact with the steering wheel). In an embodiment, when using neural networks, the network can be trained to recognize driver contact with the steering wheel based on the column torque values. In some embodiments, the vehicle speed signal, the lateral acceleration, etc. may be used to recognize the driving scenario, thus selecting the appropriate signal for maximizing the performances of the particular implementation.

In accordance with the present teachings, in an exemplary embodiment manager 10 may determine whether or not the driver has one or both hands on steering wheel 6. For example, based on the movements carried out by the hands or the damping of steering wheel movements not caused by the driver (e.g., triggered steering wheel movement by the test signal), the measurement signal from torque sensor 7 may be altered, and altered measurement signal from torque sensor 7 may be detected by manager 10. Manager 10 can then output a status signal which provides information on whether or not the driver is in contact with the steering wheel (e.g., holding the steering wheel).

In accordance with the present teachings, in an exemplary embodiment, signal generator 9 can generate a test signal which is transmitted to the steering system via electric servomotor 4. For example, the test signal can be added, via adder 8, to the other control signal for the electric servomotor 4, as can be generated by the power-assisted steering system 2 or driving assistance systems. By virtue of the test signal being passed to the electric servomotor 4, the steering system may experience movement, which may then be reflected in the measurement signal from the torque sensor 7. Here, the effect on the measurement signal is dependent on whether or not the driver is holding the steering wheel 6. The degree of movement triggered by the test signal (e.g., movement of the steering wheel) may be selected such that an operation of vehicle 1 is not impacted. In addition, the movement (e.g., of the steering wheel) is additionally preferably selected such that the driver is not disrupted by it. Signal generator 9 and manager 10 can be instructed to perform the method described herein by an external trigger signal (triggering signal) when, for example, the system requests status on whether or not the driver is holding steering wheel 6. For example, the system may ensure that the driver is holding steering wheel 6 when activating driving assistance systems so that the driver can assume full control of the vehicle 1. After receiving the trigger signal, signal generator 9 can generate the test signal for a predetermined period of time, for example a few seconds. During this time, the manager may detect measurement signals, as described herein. If the manager has determined whether or not the driver is holding steering wheel 6, it can be deactivated again. It can also be deactivated if it has not been possible to find a result with a sufficient confidence interval within a predefined period of time.

In accordance with the present teachings, in an exemplary embodiment, when it is determined whether the driver is in contact with the steering wheel, the system described herein may send to other control units or software the actual status of the measurement (e.g., a three state number indicating hands-on or hands-off or undecided). In addition, this signal may be sent to trigger a noticeable steering wheel vibration and a cluster message, requesting steering support from the driver.

Figure 2:
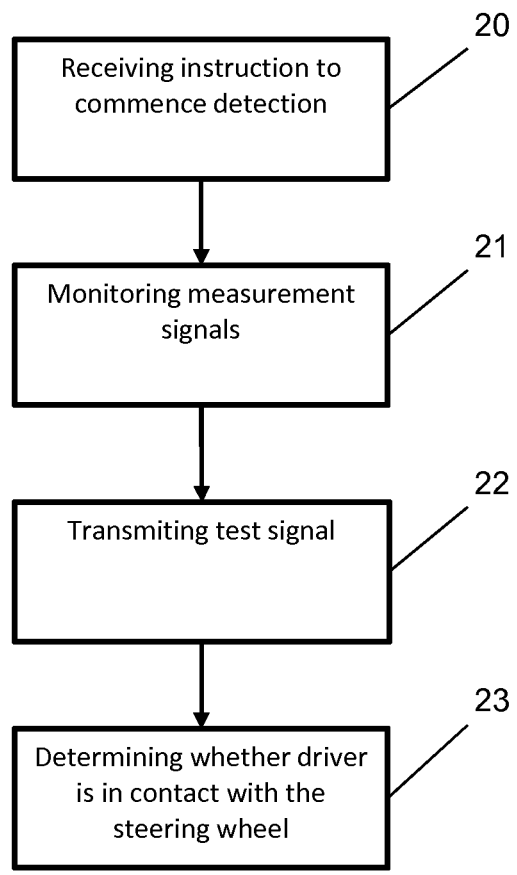
FIG. 2 shows an exemplary method for detecting steering wheel contact by a user in accordance with the present teachings.

FIG. 2 illustrates a method for detecting steering wheel contact according to an exemplary embodiment of the disclosure. It should be noted that the method or the algorithm for detecting steering wheel contact can run independently of the received signals described with reference to FIG. 1. However, in various exemplary embodiments, the received signals may also be used to perform the method and based on the additional data required increase the reliability of the method.

In accordance with the present teachings, an exemplary embodiment of the method begins with receiving an instruction to commence detection at step 20. For example, a signal may be received (e.g., at control unit 3) to commence detection.

In response to the received instruction, measurement signals may be monitored at step 21. For example, manager 10 may monitor measurement signals from one or more of torque sensor 7 and vehicle 1, as described herein. Accordingly, manager 10 may observe the measurements signals during normal operation of vehicle 1. Measurement signals may be stored at control unit 3 (e.g., at manager 10) over a period of time (e.g., predetermined period of time).

At step 22, a test signal may be transmitted. For example, control unit 3 may transmit a test signal to, for example, power assisted steering system 2. Based on the test signal, steering wheel 6 may experience movement, as described herein. In an example, a user (e.g., driver) may respond to the movement of steering wheel 6 and the measurement signal from torque sensor 7 may be altered based on the response. As described herein, one or more measurement signals (e.g., from vehicle 1) may be altered based on the response. Accordingly, manager 10 may receive the altered measurement signal from torque sensor 7 (or vehicle 1) based on the monitoring.

It may be determined whether the driver is in contact with the steering wheel at step 23. For example, manager 10 may compare an expected torque against the measurement signals from torque sensor 7 (or vehicle 1) when power assisted steering system 2 is experiencing the test signal. Here, the stored measurement signals may comprise measurement signals stored for a period of time (e.g., predetermined period of time) prior to the transmittal of the test signal, as described herein. Accordingly, based on the stored measurement signals, and expected torque may be determined. That is, an expected measurement signal from torque sensor 7 may be determined based on the monitored measurement signals from one or more of torque sensor 7 or vehicle 1 over a period of time. In an embodiment, the expected torque may be based on the test signal. For example, steering wheel 6 may experience a degree of movement (e.g., a degree of torque) based on the test signal. The expected torque may be based on the degree of movement (e.g., degree of torque) applied to the steering wheel by the test signal.

In accordance with the present teachings, in an exemplary embodiment, where a driver response comprises torque against the movement triggered by the test signal (e.g., a steering correction from the driver when movement of steering wheel 6 is triggered by the test signal), it may be determined that the driver is in contact with the steering wheel. For example, a comparison may be made between the measurement signal received from torque sensor 7 (or vehicle 1) and an expected torque. Here, a difference between the measurement signal received from torque sensor 7 and an expected torque may be compared to a criteria (e.g., threshold torque) and it may be determined that the driver is in contact with the steering wheel when the difference meets the criteria (e.g., the difference is greater than a threshold). In an embodiment, the method of FIG. 2 may be terminated prior to determining that the driver is in contact with the steering wheel when the method does not indicate a reliable determination within a predetermined time period (e.g., when the difference does not meet the criteria).

Figure 3:
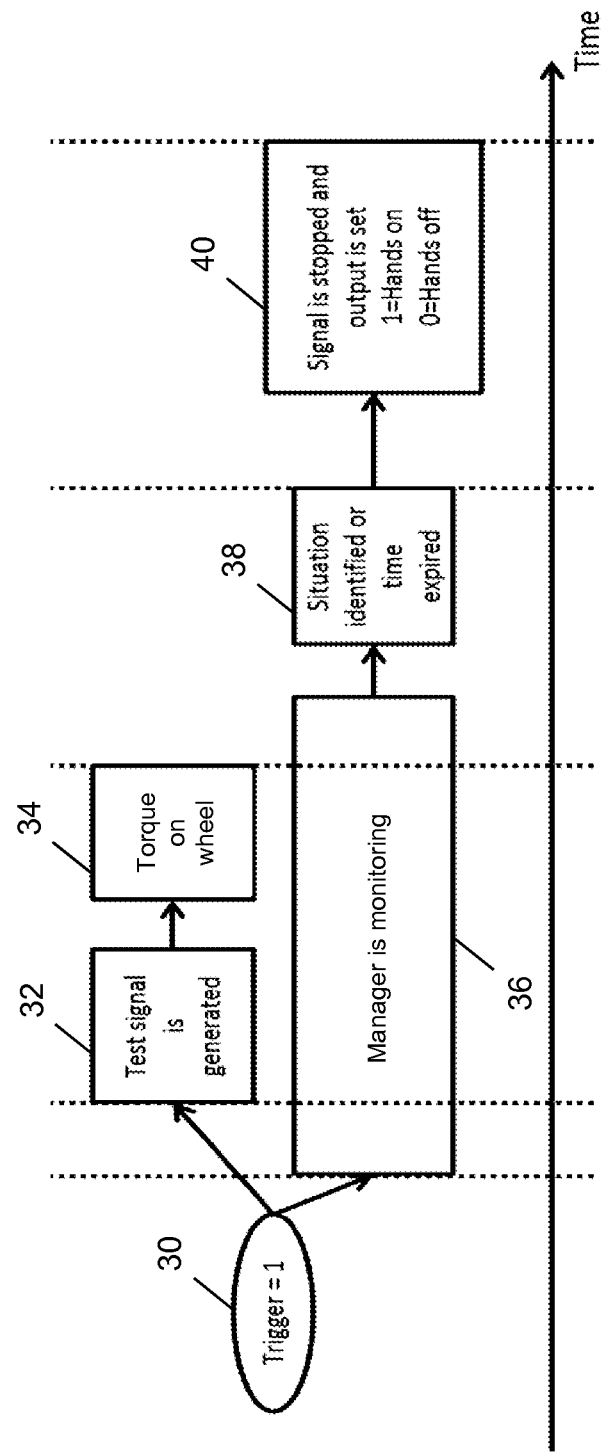
FIG. 3 shows another exemplary method for detecting steering wheel contact by a user in accordance with the present teachings.

FIG. 3 illustrates a method for detecting steering wheel contact according to an exemplary embodiment of the disclosure. It should be noted that the method or the algorithm for detecting steering wheel contact can run independently of the received signals described with reference to FIG. 1. However, in various exemplary embodiments, the received signals may also be used to perform the method and based on the additional data required increase the reliability of the method.

In accordance with the present teachings, an exemplary embodiment of the method begins with triggering step 30. For example, a signal may be received (e.g., at control unit 3) that triggers the process to detect steering wheel contact.

In response to the triggering step, measurement signals may be monitored at step 36. For example, manager 10 may monitor measurement signals from one or more of torque sensor 7 and vehicle 1, as described herein. Accordingly, manager 10 may observe the measurements signals during normal operation of vehicle 1. Measurement signals may be stored at control unit 3 (e.g., at manager 10) over a period of time (e.g., predetermined period of time).

In addition, in response to the triggering step, a test signal may be generated at step 32. For example, control unit 3 may generate and transmit a test signal to, for example, power assisted steering system 2. At step 34, based on the test signal, torque may be applied to the steering wheel. For example, steering wheel 6 may experience movement, as described herein.

In an example, a user (e.g., driver) may respond to the movement of steering wheel 6 and the measurement signal from torque sensor 7 may be altered based on the response. As described herein, one or more measurement signals (e.g., from vehicle 1) may be altered based on the response. Accordingly, manager 10 may receive the altered measurement signal from torque sensor 7 (or vehicle 1) based on the monitoring.

It may be determined whether the driver is in contact with the steering wheel at step 38. For example, manager 10 may compare an expected torque against the measurement signals from torque sensor 7 (or vehicle 1) when power assisted steering system 2 is experiencing the test signal. Here, the stored measurement signals may comprise measurement signals stored for a period of time (e.g., predetermined period of time) prior to the transmittal of the test signal, as described herein. Accordingly, based on the stored measurement signals, and expected torque may be determined. That is, an expected measurement signal from torque sensor 7 may be determined based on the monitored measurement signals from one or more of torque sensor 7 or vehicle 1 over a period of time. In an embodiment, the expected torque may be based on the test signal. For example, steering wheel 6 may experience a degree of movement (e.g., a degree of torque) based on the test signal. The expected torque may be based on the degree of movement (e.g., degree of torque) applied to the steering wheel by the test signal.

In accordance with the present teachings, in an exemplary embodiment, where a driver response comprises torque against the movement triggered by the test signal (e.g., a steering correction from the driver when movement of steering wheel 6 is triggered by the test signal), it may be determined that the driver is in contact with the steering wheel. For example, a comparison may be made between the measurement signal received from torque sensor 7 (or vehicle 1) and an expected torque. Here, a difference between the measurement signal received from torque sensor 7 and an expected torque may be compared to a criteria (e.g., threshold torque) and it may be determined that the driver is in contact with the steering wheel when the difference meets the criteria (e.g., the difference is greater than a threshold).

At step 40, the test signal may be may be terminated. For example, it may be detected (e.g., reliably detected) that the driver is in contact with the steering wheel, and the test signal may accordingly be terminated. In another example, prior to determining that the driver is in contact with the steering wheel, the test signal may be terminated when the method does not indicate a reliable determination within a predetermined time period (e.g., when the difference does not meet the criteria).

The details and descriptions of control unit 3 and power assisted steering system 2 are described herein and likewise apply here in connection with FIGS. 2 and 3; they are therefore not repeated.

The methods illustrated in FIGS. 2 and 3 can be performed in one or more devices of system 1. For example, the method can be performed by one or more of control unit 3 (e.g., manager 10 and/or signal generator 9) and power assisted steering system 2. The control unit can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for detecting steering wheel contact, comprising:
    transmitting a test signal to a power assisted steering system to initiate application of a test torque to a steering wheel over a period of time, the test signal comprising a sinusoidal wave with a frequency and amplitude an amplitude;
    receiving, from a torque sensor, measurement signals indicative of actual steering wheel torque over the period of time;
    comparing the actual torque to an expected torque to determine a phase shift in at least one of amplitude and frequency between the test signal and the received measurement signals; and
    determining whether a user is in contact with the steering wheel based on the comparison and the determined phase shift.

2. The method of claim 1, wherein a manager performs the comparing and determining steps.

3. The method of claim 2, wherein the manager uses at least one of a neural network work, a spectral transformation, and a statistical filter to determine whether the user is in contact with the steering wheel.

4. The method of claim 1, wherein the actual torque comprises a reaction torque representative of steering wheel torque from the user in response to the test signal.

5. The method as claimed in claim 1, wherein the transmission of the test signal and the test torque applied to the steering wheel are terminated after the period of time has elapsed.

6. A system for detecting steering wheel contact by a user, the system comprising:
    a vehicle;
    a power assisted steering system that comprises a torque sensor and a steering wheel, wherein a test torque is applied to the steering wheel based on receipt of a test signal to initiate application of the test torque by the power assisted steering system over a period of time, the test signal comprising a sinusoidal wave with a frequency and amplitude; and
    a manager configured to:
        receive, from the torque sensor, measurement signals indicative of actual steering wheel torque over the period of time;
        compare the actual torque to an expected torque to determine a phase shift in at least one of amplitude and frequency between the test signal and the received measurement signals; and
        determine whether a user is in contact with the steering wheel based on the comparison and the determined phase shift.

7. The system of claim 6, wherein the manager uses at least one of a neural network work, a spectral transformation, and a statistical filter to determine whether the user is in contact with the steering wheel.

8. The system of claim 6, wherein the actual torque comprises a reaction torque representative of steering wheel torque from the user in response to the test signal.

9. A non-transitory computer readable storage medium storing program code which, when executed by a processor, performs the steps of:
    transmitting a test signal to a power assisted steering system to initiate application of a test torque to a steering wheel over a period of time, the test signal comprising a sinusoidal wave with a frequency and amplitude an amplitude;
    receiving, from a torque sensor, measurement signals indicative of actual steering wheel torque over the period of time;
    comparing the actual torque to an expected torque to determine a phase shift in at least one of amplitude and frequency between the test signal and the received measurement signals; and
    determining whether a user is in contact with the steering wheel based on the comparison and the determined phase shift.

10. The method of claim 1, wherein the expected torque is based on signals indicative of actual steering wheel torque monitored prior to transmitting the test signal.

11. The method of claim 1, further comprising:
    monitoring measurement signals received from the torque sensor over a predetermined period of time prior to transmitting the test signal; and
    storing the monitored measurement signals, wherein the expected torque is based on stored measurement signals.

12. The system of claim 6, wherein the manager is further configured to:
    monitor measurement signals received from the torque sensor over a predetermined period of time prior to transmitting the test signal; and
    store the monitored measurement signals, wherein the expected torque is based on stored measurement signals.

13. The method of claim 1, wherein an amplitude of the applied test torque is based at least in part on a lateral acceleration of the vehicle.

14. The system of claim 6, wherein an amplitude of the applied test torque is based at least in part on a lateral acceleration of the vehicle.

15. A method for detecting steering wheel contact, comprising:
    transmitting a test signal to a power assisted steering system to initiate application of a test torque to a steering wheel over a period of time, the test signal comprising a sinusoidal wave with a frequency and amplitude;
    receiving, from a torque sensor, measurement signals indicative of actual steering wheel torque over the period of time;
    determining a phase shift in at least one of amplitude and frequency between the test signal and the received measurement signals; and determining whether a user is in contact with the steering wheel based on and the determined phase shift.

16. The method of claim 15, wherein determining whether the user is in contact with the steering wheel based on the determined phase shift includes determining that the user is in contact with the steering wheel when a maximum phase shift threshold is exceeded.

17. The method of claim 1, wherein determining whether the user is in contact with the steering wheel based on the determined phase shift includes determining that the user is in contact with the steering wheel when a maximum phase shift threshold is exceeded.

* * * * *